US008500556B2

(12) United States Patent
Morrow et al.

(10) Patent No.: US 8,500,556 B2

(45) Date of Patent: *Aug. 6, 2013

(54) TWO-WIRE EXCHANGE SYSTEM

(75) Inventors: James W. Morrow, Sparks, NV (US); Carmen DiMichele, Sparks, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1304 days.

This patent is subject to a terminal disclaimer.

(21) Appl. No.: 11/735,333

(22) Filed: Apr. 13, 2007

(65) Prior Publication Data

US 2007/0202954 A1 Aug. 30, 2007

Related U.S. Application Data

(63) Continuation-in-part of application No. 11/072,742, filed on Mar. 3, 2005, now Pat. No. 7,244,182, which is a continuation of application No. 09/967,573, filed on Sep. 28, 2001, now Pat. No. 6,863,611.

(51) Int. Cl.
*A63F 13/12* (2006.01)

(52) U.S. Cl.
USPC .................................. 463/42; 463/40; 463/41

(58) Field of Classification Search
USPC ...................................................... 463/40, 42
See application file for complete search history.

(56) References Cited

U.S. PATENT DOCUMENTS

| | | | | |
|---|---|---|---|---|
| 5,580,309 | A * | 12/1996 | Piechowiak et al. | 463/16 |
| 5,655,961 | A * | 8/1997 | Acres et al. | 463/27 |
| 6,135,887 | A * | 10/2000 | Pease et al. | 463/42 |
| 6,394,900 | B1 * | 5/2002 | McGlone et al. | 463/20 |
| 6,443,839 | B2 * | 9/2002 | Stockdale et al. | 463/16 |
| 6,589,119 | B1 * | 7/2003 | Orus et al. | 463/42 |
| 6,611,522 | B1 * | 8/2003 | Zheng et al. | 370/395.21 |
| 6,682,423 | B2 * | 1/2004 | Brosnan et al. | 463/29 |
| 6,875,110 | B1 * | 4/2005 | Crumby | 463/42 |
| 2002/0016193 | A1 * | 2/2002 | Morris et al. | 463/1 |

* cited by examiner

*Primary Examiner* — Dmitry Suhol
*Assistant Examiner* — Jay Trent Liddle
(74) *Attorney, Agent, or Firm* — Brooke Quist; Marvin Hein

(57) ABSTRACT

A two-wire exchange system is disclosed that enables a gaming device having one communication port to function as a gaming device having a plurality of communication ports. The two-wire exchange system allows a gaming device having only a single communication port to connect to two or more system hosts simultaneously. The two-wire exchange system is an intelligent multiplexer that communicates using the same protocol as the system hosts to which it is connected. The two-wire exchange system has the ability to respond to a poll from the system host by indicating that the gaming device is busy, and that the system host should poll the gaming device again. This is provided to avoid and to prevent data collisions. The two-wire exchange system is also able to directly arbitrate and facilitate the communication between one or more peripheral hosts and the system hosts.

15 Claims, 1 Drawing Sheet

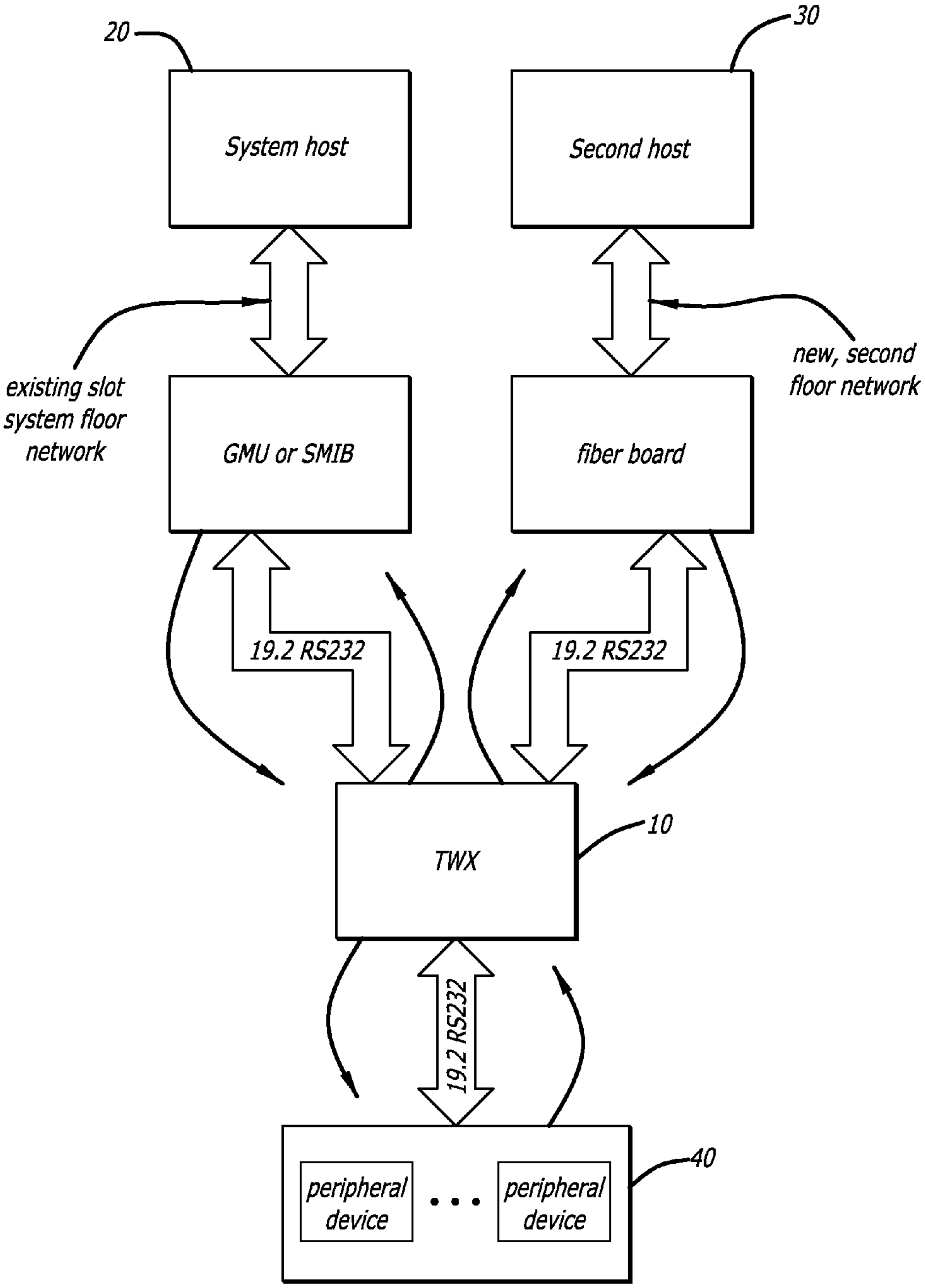
20
30
System host
Second host
existing slot
system floor
network
new, second
floor network
GMU or SMIB
fiber board
19.2 RS232
19.2 RS232
TWX
10
19.2 RS232
peripheral
device
peripheral
device
40

TWO-WIRE EXCHANGE SYSTEM

CROSS-REFERENCE TO RELATED APPLICATIONS

This application is a continuation-in-part application of U.S. patent application Ser. No. 11/072,742 filed Mar. 3, 2005, which is a continuation of U.S. patent application Ser. No. 09/967,573 filed Sep. 28, 2001, now U.S. Pat. No. 6,863, 611, issued Mar. 8, 2005, which are hereby incorporated herein by reference in their entirety.

This application is related to U.S. patent application Ser. No. 11/329,715 filed Jan. 10, 2006, entitled Controlled Access Layer System and Method, which is a continuation-in-part of U.S. patent application Ser. No. 10/943,771, filed Sep. 16, 2004, wherein all related applications are hereby incorporated by reference in their entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates generally to gaming systems and, more particularly, to gaming systems that include single port devices that are capable of communicating with multiple system hosts simultaneously.

BACKGROUND

In the gaming industry, most gaming machines currently on the market have only one host communication port with which to communicate with a system host. System hosts communicate with gaming machines for a variety of reasons, including by way of example only, and not by way of limitation, tracking player activity, tracking accounting information, and the like. However, it is becoming increasingly desirable to be able to connect a gaming machine to more than one system host, in order to utilize the capabilities of more than one system host, concurrently. Accordingly, gaming machines with only a single host communication port cannot connect to more than one system host. Therefore, owners of these single port gaming machines currently must select a single system host that will be connected to the gaming machines at any given time. In this manner, gaming machines with a single host communication port are more limited in their connectivity than gaming machines with multiple host communication ports.

For example, most slot machines today are single port machines that connect to a system host through their single communication port. Typically, this system host tracks player and accounting information, as well as performing other minor related tasks. Additionally, other hosts exist that include capabilities such as ticket printing. A ticket printing system enables a gaming machine to print tickets that a player may exchange for cash instead of dispensing cash directly to the player. Thus, casino owners may desire to connect their gaming machines to both an accounting system host and a ticket-printing host. Currently, however, only gaming machines that have at least two communication ports can connect to both an accounting system host and a ticket-printing host, simultaneously.

Importantly, gaming machines as currently constructed, are designed as dedicated devices with exactly the number of inputs and outputs required for their particular purpose. Thus, when a second or third communication port is required, an entire new hardware board design must be produced, which can be an expensive and time-consuming task. Connectivity devices, such as USB, SCSI, and Firewire, that are used to provide personal computers ("PCs") with an interface to peripherals, (e.g., scanners, printers, CD-ROM drives, and the like) cannot be used to connect gaming machines to system hosts because these devices do not communicate using a protocol that is compatible with that used by gaming machines and hosts. Furthermore, simple splitting and "daisy chaining" techniques, which are used in the PC industry, also cannot be used with gaming machine host communication ports.

Thus, today's gaming machines are not like PCs that can be expanded with plug in cards. In contrast, a typical gaming machine has a fixed number of communication ports, each which is permanently assigned to a specific function, including by way of example only, and not by way of limitation, systems communication, progressive jackpot communication, and perhaps, bill acceptor communication. Accordingly, when a system host with 'ticket printing' capabilities was developed, most gaming machines did not have the extra serial port needed for connecting to this host. Thus, the purchase of a new multi-port system was required in order to connect the ticket printing host, as well as the existing system host.

Moreover, communication with a system host or ticket-printing host is a demanding job for current gaming machine software. Today's gaming machines are design to handle communicating with one system host. Accordingly, adding the workload of a second system host for ticket printing capabilities is a daunting task for existing software.

Accordingly, those skilled in the art have long recognized the need for a system that enables a gaming machine having a single host communication port to function as a gaming machine having multiple communication ports, thereby enabling the gaming machine with one communication port to communicate with more than one system host simultaneously. Such as system would allow owners of single port gaming machines to extend the useful life of such machines, and not require these owners to purchase new multi-port machines in order to obtain the benefits of connecting to more than one system host simultaneously. Further, a gaming machine having the single port could also be connected to a system host and one or more peripheral devices that might also require communication with the gaming machine. The present invention clearly addresses these and other needs.

SUMMARY

Briefly, and in general terms, the invention provides a system that enables a gaming machine having a single communication port to function as a gaming device having multiple communication ports so that the gaming machine having the one port can communicate with more than one host system simultaneously. Further, the system allows a casino to connect a gaming machine having the one communication port to more than one peripheral device needing to communicate with a host computer.

More particularly, by way of example and not necessarily by way of limitation, the invention provides a gaming machine system comprising a gaming machine having a communication port and an intelligent conduit, multiplexer, or router that enables the gaming machine to act as if it has multiple communication ports. The conduit, multiplexer or router is a two-wire exchange system that communicates using a protocol specific response, i.e., the same protocol that the hosts, to which it is connected, use to communicate. The two-wire exchange system controls the timing of when each of the hosts or the peripherals communicates with the gaming machine.

The system hosts communicate with the gaming machine using a series of polls. Each poll lasts for a period of time. However, the period of time in which the gaming machine responds may be longer than that of the poll. In this event, the intelligent conduit, multiplexer or router indicates to the system host that the gaming machine is busy and that the system host should send the poll again. The invention also provides a multiplexer comprising a two-wire exchange system for use with a gaming machine wherein the two-wire exchange system responds to independent polls from a plurality of host systems while arbitrating the polls to prevent data collision.

The invention further provides a method of enabling a gaming machine having one communication port to function as a gaming machine having two communication ports comprising: multiplexing the communication port via a multiplexer and connecting a plurality of hosts to the multiplexer, wherein the multiplexer communicates with the plurality of hosts using a protocol-specific response, i.e., the same protocol as the hosts use to communicate. A method of multiplexing data sent by a plurality of hosts to a gaming machine, comprising: responding to independent polls from a plurality of host systems, and arbitrating the polls to prevent data collisions, is also provided.

The invention provides a method of multiplexing data sent by a plurality of hosts to a gaming machine, comprising: passing a poll sent by a host to the gaming machine, the poll lasting for a period of time; waiting for the specified period of time that the poll exists for a response from the gaming machine; and sending a response to the host, the response indicating that the gaming machine is busy, and that the host should poll the gaming machine again.

Another aspect of the invention is directed toward gaming systems having data flow management capabilities that assess and manage data priority. In one embodiment, a gaming system includes a gaming device having a communication port and an intelligent multiplexer in simultaneous communication with a plurality of system hosts. The intelligent multiplexer enables the communication port to function as if the communication port is a plurality of ports, and the intelligent multiplexer prioritizes data flow from the plurality of system hosts.

In another embodiment, a gaming system includes a gaming device having a communication port, and an intelligent multiplexer in simultaneous communication with a plurality of system hosts where the intelligent multiplexer enables the communication port to function as if the communication port is a plurality of ports. The intelligent multiplexer also adjusts the availability of fixed-size response cells based upon an asynchronous transfer mode (ATM) algorithm that assigns a priority designation to incoming messages.

In yet another embodiment, a gaming system includes a gaming device having a communication port, and an intelligent multiplexer in simultaneous communication with a plurality of system hosts where the intelligent multiplexer enables the communication port to function as if the communication port is a plurality of ports. The intelligent multiplexer also adjusts the allocation of resources according to a resource demand of a message from each of the system hosts.

Additionally, various methods of managing data flow in a gaming device having an intelligent multiplexer are disclosed herein. According to one method, data packets transmitted from a plurality of system hosts are classified and transmitted to the intelligent multiplexer of a gaming device. The data packages are received at the intelligent multiplexer and prioritized based upon the classification of the data packets. The data packets are then transmitted to the gaming device based upon the priority of the data packets. According to one method, the data packets are classified according to access control lists, extended access control lists, or IP precedence bits. In another method, the data packets are classified according to quality of service parameters.

Another method is directed to managing data flow in a gaming device having one communication port and an intelligent multiplexer that enables the communication port to operate as if the communication port is a plurality of ports in communication with one or more system hosts. According to one method, one or more messages are received from one or more system hosts, wherein each message includes a header and a payload. The resource demand of each message is determined by reading the header of each message. The resources of the intelligent multiplexer are then arbitrated based on the resource demands of the message.

Another aspect of the invention is directed to gaming systems having a two wire exchange system that acts as a central distribution point within the gaming machine. That is, one or more system hosts may directly communicate with one or more peripheral devices within the gaming machine. According to one embodiment, the gaming system includes a gaming device having a single Ethernet communication port, and an intelligent multiplexer in simultaneous communication with a plurality of system hosts and peripheral devices. The intelligent multiplexer enables the Ethernet communication port to function as if the communication port is a plurality of ports, and the intelligent multiplexer arbitrates communication between the peripheral devices and the system hosts.

In another embodiment, the gaming system includes a gaming device having a single communication port and an intelligent multiplexer in simultaneous communication with a plurality of system hosts. The intelligent multiplexer enables the communication port to function as if the communication port is a plurality of ports. The intelligent multiplexer includes a game monitoring unit to monitor one or more games on the gaming device and game accounting-related data.

Hence, the invention satisfies the need for a system that enables a gaming machine having a single communication port to function as a gaming device having multiple communication ports so that the gaming machine can communicate simultaneously with more than one host system. It also allows a casino to connect a gaming machine having the one communication port to more than one peripheral device needing to communicate with a host computer.

Other features and advantages will become apparent from the following detailed description, taken in conjunction with the accompanying drawings, which illustrate by way of example, the features of the various embodiments.

BRIEF DESCRIPTION OF THE DRAWING

FIG. 1 illustrates a relational diagram of a two-wire exchange system, constructed in accordance with the invention, utilized as an intelligent multiplexer between two host systems and a gaming device.

DETAILED DESCRIPTION OF THE PREFERRED EMBODIMENTS

A preferred embodiment of the two-wire exchange system, constructed in accordance with the invention, is directed towards an intelligent multiplexer that enables a gaming device having a single communication port to communicate with two or more system hosts simultaneously. The two-wire exchange system provides protocol-specific responses to long polling by the system hosts that comply with the strict timing response windows required by the adopted protocol. Referring now to the drawings, wherein like reference numerals denote like or corresponding parts throughout the drawings and, more particularly to FIG. 1, there is shown one embodiment of a two-wire exchange system 10, constructed in accordance with the invention.

In a preferred embodiment of the invention, the two-wire exchange system 10 acts as a multiplexing conduit that connects two system hosts 20 and 30 to a slot machine 40 (or other gaming device). The two-wire exchange system 10 of the invention is an intelligent system that responds to polling by the system hosts 20 and 30 using protocol-specific response messages that are native to the protocol being utilized by the system hosts and the gaming device 40. In this way, the two-wire exchange system 10 enables a gaming device 40 having only a single communication port 50 to communicate with two (or more) different system hosts 20 and 30, all utilizing the same protocol, simultaneously.

Specifically, the two-wire exchange system 10 overcomes challenges in communications timing management related to strict timing response windows and long polling. In a preferred embodiment of the invention, the two-wire exchange system 10 is configured to intelligently communicate in the specific casino accounting protocol that is implemented by the system hosts 20 and 30 and the gaming device 40. Advantageously, the two-wire exchange system 10 utilizes off-the shelf hardware and open source software to provide the benefits of reliability, cost minimization, and reusability.

Traditionally, slot machines 40 and other gaming devices have had only one host communication port 50. However, situations arise where it is desirable (or necessary) to connect a gaming device 40 to both a traditional slot system host 20 and to an additional system host 30 (or other peripheral). In a preferred embodiment of the invention, the two-wire exchange system 10 solves this problem by connecting a gaming device 40 to both a traditional slot system host 20 and another system host 30 (e.g., a system host that provides ticket printing capabilities), simultaneously. Proper utilization of the invention allows a single communication port slot machine 40 to connect to a second system host 30 (or to a peripheral) as well as the original slot system host 20, by positioning the two-wire exchange system 10 between the gaming device 40 and the system hosts 20 and 30. According to one embodiment, the single communication port of the slot machine is an Ethernet port. In this embodiment, the slot machine is able to communicate with multiple hosts simultaneously via protocols such as, but not limited to, Gaming Standards Association Best of Breed (GSA BOB) or International Gaming Technology (IGT) SuperSAS, or GSA G2S protocols. These protocols allow slot machines and servers to communicate over a TCP/IP communications link.

The two-wire exchange system 10 responds to independent polling from two system hosts 20 and 30 while arbitrating the polls in order to prevent data collision. The two-wire exchange system 10 then passes those requests for information (polls) down to the slot machine 40 and waits for the response to come back from the slot machine. After receiving the response, the two-wire exchange system 10 sends the response back to the system host 20 or 30 which made that request.

Moreover, the two system hosts 20 and 30 also attempt to address the gaming device 40. Thus, since the two-wire exchange system 10 is positioned between the two system hosts 20 and 30 and the slot machine 40, the system 10 must recognize when a system host is requesting an address for the slot machine, retrieve the address from the slot machine, and pass the address back to the requesting system host.

In a preferred embodiment of the invention, the two-wire exchange system 10 acts only as a conduit (albeit an intelligent conduit) between the two system hosts 20 and 30 and a gaming device 40. Importantly, the two-wire exchange system 10 does not initiate any protocol-specific messages or transactions on its own. A system host 20 or 30 must supply the polls and acknowledgements, and the gaming device 40 must supply the exceptions, responses, and chirps. The two-wire exchange system 10 then responds to these messages and/or transactions, as appropriate.

In a preferred embodiment of the invention, the two-wire exchange system 10 is used as an intelligent multiplexer to route polling requests between two system hosts 20 and 30 and a slot machine 40 having a single communication port 50. In one preferred embodiment, the first system host 20 is a traditional slot accounting system host, and the additional system host 30 provides ticket-printing functionality (e.g., IGT's EZ-pay host system) to a slot machine 40. In this particular embodiment, both system hosts 20 and 30 use a protocol that is designed to transfer casino related accounting information (e.g., the SAS protocol). Moreover, both of these system hosts 20 and 30 poll (i.e., request information from) the slot machine 40 frequently, i.e., as fast as every twenty milliseconds.

As briefly mentioned above, the two-wire exchange system 10 of the invention utilizes a uniquely intelligent form of multiplexing. Traditionally, multiplexing is characterized with respect to communication transmissions and protocols, as a technique for allowing multiple messages or signals to share a communication transmission channel. Two main ways of sharing a channel are time division multiplexing (TDM) and code division multiplexing (CDM). The intelligent multiplexing of the invention is a form of time division multiplexing. In time division multiplexing, small "time slices" from each input channel are sent in sequence, so that each channel has a proportional amount of time on the output channel. A multiplexer is a device for channeling several data streams into a single communications channel. Typically, for two input channels, a traditional "dumb" multiplexer will simply toggle between time slices for each of the two channels.

However, in the situation contemplated by the invention, the time required to fetch responses from the long polling, is greater than the time slice allotted for the response window, as dictated by the adopted communication protocol. Accordingly, upon receipt of a long poll from a host, the two-wire exchange system 10 immediately responds back to the host with a "poll again later" message (i.e., requests that the host ask for the information again during the host's next time slice). The two-wire exchange system 10 then sends the long poll on to the gaming machine 40, which processes the request (taking longer than the allowed response time). The two-wire exchange system 10 keeps sending the "poll again later" message until the gaming machine 40 is done responding, thus giving the gaming machine plenty of time to process the poll. Then when the two-wire exchange system 10 receives the response from the gaming machine 40 and the long poll is sent again from the system, the system responds to the host with the gaming machine's response to the poll. Thus, in this type of intelligent multiplexing, long poll responses can be obtained by the hosts that cannot be processed within a single time slice.

The two-wire exchange system 10 differs from other multiplexing devices that are currently utilized, in that the two-wire exchange system 10 is intelligent and can communicate in the specific protocol utilized by the gaming device 40 and the system hosts 20 and 30. Thus, the two-wire exchange system 10 can intelligently respond to polling from the system hosts 20 and 30 using protocol-specific responses.

In one preferred embodiment, the specific protocol implemented is SAS ("Slot Accounting System"). The SAS protocol is well known and is specifically designed for the communication of information related to casino accounting, security and player tracking. In other preferred embodiments, the two-wire exchange system 10 is configured to be utilized with a gaming device 40 and the system hosts 20 and 30 that all speak a casino accounting related protocol that is different than the SAS protocol. For example, a TCP/IP protocol such as, but not limited to, a BOB-like XML is used by a system host to communicated with the gaming machine. As those skilled in the art will appreciate, a BOB-like XML is a protocol specifically designed for communications between slot machine to slot machine server (e.g., GSA G2S or IGT Super-SAS. Thus, the two-wire exchange system 10 is designed for the intelligent multiplexing of polling requests from two system hosts 20 and 30 to a single gaming device 40, in order to report and transfer information regarding real time winnings and other casino information.

Additionally, the two-wire exchange system 10 of the invention also differs from other multiplexing devices by enabling long poll responses to be made within strict time requirements that would not otherwise be possible using a traditional "dumb" multiplexer. The two-wire exchange system 10 of the invention is configured to perform in this manner because the specific protocol with which the system is designed to function requires a multi-drop of fifty slot machines 40 per second on each line. This timing requirement creates strict response windows to the polling. Therefore, every response window (to the polling) has a timing requirement of 20 milliseconds. Due to this strict time requirement, it is possible for a polling response to carry over to the next response window's time slice, thus resulting in data collisions. In other words, it is possible for a polling response from the first system host 20 and 30 to take longer to complete than the time slice allocated to the first system host's response window, causing the polling response to carry over to the response window dedicated to the other system host 20 or 30. The manner in which the two-wire exchange system 10 manages long polls prevents this type of event, i.e., a data collision.

In a preferred embodiment of the invention, the two-wire exchange system 10 implements a unique method of handling long polls. A long poll is a request for information that cannot be completed in a single response window. Specifically, the two-wire exchange system 10 requires the system host 20 or 30 to long poll twice (or more) for data. During the first long poll by the system host 20 or 30, the two-wire exchange system 10 fetches the response from the slot machine 40. During the second (or later) long poll by the system host 20 or 30, the two-wire exchange system 10 actually delivers the response (which has already been fetched) back to the system host 20 or 30. Thus, when the two-wire exchange system 10 is fetching a response from the slot machine 40 (during the first poll), the exchange system has already told the system host 20 or 30 to poll again later (i.e., perform another poll during the next time slice allocated to that host). In one specific embodiment, this "poll again later" message is performed by a "Game Machine Busy" response (when SAS protocol is utilized). The two-wire exchange system 10 sends the "poll again later" message to the host 20 or 30 when the exchange system knows that it will take the gaming device 40 longer than its allocated time slice for the polling response to be processed.

Although a preferred embodiment of the two-wire exchange system 10 is configured for communication in a protocol that assumes fifty slot machines 40 are connected to each communication line, in other preferred embodiments the two-wire exchange system 10 is configured to function with other protocols that impose other strict timing requirements. Since the slot machines 40 are unable to comply with these strict timing requirements by themselves, the software algorithms in the two-wire exchange system 10 enable the slot machines to comply with the timing requirements (for responses to long polling) within the time slices dictated by the adopted protocol. Maintenance of the time slice allocated for the communication response window of each slot machine 40 is crucial to preventing data collisions. It is important to note that the slot machine 40 and the system hosts 20 and 30 all respond at different timing rates.

In a preferred embodiment of the invention, the software in the two-wire exchange system 10 is finite state machine (FSM) software that divides or manages the connection of a gaming device 40 with the connections of two (or more) system hosts 20 and 30. (Finite state machine software stores a status at a given time, and then operates on input to change the status and/or to cause an action or output to take place for a given status change.). The two system hosts 20 and 30 have no knowledge of the other and the FSM software uses the specific protocol to keep each host running smoothly. In a preferred embodiment of the invention, the two-wire exchange system 10 makes extensive use of the SAS protocol-specific "Gaming Machine Busy" response to ensure that long polling responses do not carry over to a time slice that is dedicated to the other host, thus facilitating alternating access between the two system hosts 20 and 30 and the gaming device 40.

In a preferred embodiment of the invention, the two system hosts 20 and 30 request information from the gaming device 40 (through the two-wire exchange system 10) as often as every twenty milliseconds. Thus, there are a lot of "chirps," i.e. where a system host 20 or 30 requests information from the gaming device 40, and the gaming device responds that there is no new information. However, when there is new information to report in response to a poll, this response often takes the gaming device 40 longer than twenty milliseconds to process. In this situation, the two-wire exchange system 10 responds to the system host 20 or 30 by asking the host to poll again later (when using the SAS protocol, the "Game Machine Busy" response is utilized). This response tells the system host 20 or 30 that the gaming device 40 is busy processing the request and that the system host should wait and ask (poll) again in its next allotted time slice. Then, when the system host 20 or 30 asks again, the information (poll response) has already been retrieved and is sent right out to the requesting system host. Thus, by extensive use of a "poll again next time slice" type of message, the two-wire exchange system 10 is able to handle polling responses that cannot be completed within the time slice allocated for the response window of the polling system host.

In one preferred embodiment, the two-wire exchange system 10 speaks to the current system port 50 of a slot machine 40 using SAS version 5 protocol. The two-wire exchange system 10 plays the roll of an intelligent arbitrator or router. Importantly, the two-wire exchange system 10 performs this function by using protocol-specific responses to the gaming device 40 and the system hosts 20 and 30. Additionally, the two-wire exchange system 10 provides the significant advantage of being compatible with the well known Bally Gaming and Systems S6000, V7000, and EVO platforms. Moreover, the two-wire exchange system 10 is often compatible with gaming platforms designed by other game manufacturers, as well.

In one specific preferred embodiment of the invention, the two-wire exchange system 10 uses the RT Linux operating system. The RT Linux operating system takes full advantage of the strict timing requirements of casino accounting system protocols (e.g., the SAS protocol). RT Linux is a hard real-time operating system. Advantageously, RT Linux is open sourced. However, in other preferred embodiments of the invention, other equivalent hard real-time operating systems also may be utilized.

In one preferred embodiment of the invention, the code for the two-wire exchange system 10 software is written in the "C" programming language. However, in other embodiments of the invention, other compatible programming languages may be utilized. Preferably, the executable is run as a real-time module that consists of: (1) a UART (Universal Asynchronous Receiver-Transmitter), (2) a message parser, and (3) a FSM. These three components all have hard real-time requirements in the sub-millisecond range. Further, these three components easily handle the three 19,200 baud data channels contemplated in a preferred embodiment of the invention.

In another aspect of one specific preferred embodiment of the invention, the hardware of the two-wire exchange system 10 is a PC 104 platform running an X86 based MachZ processor and using 64 megabits of memory. The PC 104 platform is built by Tri-M Systems of Canada and has a model number of MZ104. Preferably, the MZ104 device has 32 megabits of RAM and 32 megabits of non-mechanical disk memory. The MZ104 device provides the advantages of: (1) using an Intel-based operating system; (2) having small size dimensions; and (3) providing access to many peripheral devices. However, in other preferred embodiments of the invention, other hardware systems with equivalent capabilities are utilized.

Additionally, in one specific preferred embodiment of the invention, the two-wire exchange system 10 comes enclosed in a metal box with one power connector and four serial connectors. Preferably, three of the serial connectors are labeled for either a host or a slot. One remaining serial connector is allocated for setup and diagnostics. Moreover, preferably the serial connectors are in a DB9 format, and the serial protocol is RS232. In a preferred embodiment, the power is a walled based power adapter.

In another preferred embodiments of the invention, the two-wire exchange system 10 is configured for use as an intelligent multiplexer that utilizes a different specified protocol, preferably a protocol that has a substantially equivalent functionality to the "poll again later" message (or "Game Machine Busy" response in the SAS protocol). Additionally, in yet another preferred embodiment to the invention, the two-wire exchange system 10 is configured to act as an intelligent multiplexer for more than two system hosts 20 and 30. Moreover, in still another preferred embodiment of the invention, the two-wire exchange system 10 is configured to act as a protocol converter, as well as an intelligent multiplexer. Advantageously, in the two-wire exchange system 10 that also acted as a protocol converter, a gaming device 40 would only needs to know one protocol and exchange system 10 would allow the gaming device 40 to talk to various system hosts that spoke various languages. For example, in one embodiment, the two wire exchange system receives and converts SAS protocol messages from the gaming machine into BOB protocol messages that are then sent to the multiple hosts. In other embodiments, the gaming machine uses other protocols such as, but not limited to, IGT SuperSAS and GSA BOB.

In yet another preferred embodiment, the two wire exchange system is configured as an enhanced multiplexer that includes a game monitoring unit (GMU). In one preferred embodiment, an interface referred to as a "SMIB" (smart interface board or slot machine interface board) is coupled to the GMU. The SMIB is coupled to one or more peripherals or other devices connected to the gaming machine. Accordingly, the two wire exchange system having the GMU is "enhanced" because the GMU is able to monitor the game, coin status, player winnings, and the slot machine and send this information to the appropriate host(s) as well as arbitrate the various messages and requests sent to the slot machine In other preferred embodiments of the invention, the two-wire exchange system 10 includes Quality of Service capabilities that enable the system to determine the priority in which data or information is sent to a gaming machine 40. According to one preferred embodiment, the two-wire exchange system having Quality of Service capabilities includes a managed Ethernet switch. The Quality of Service capability allows the system 10 to prioritize data packets received from one or more system hosts 20 and 30. With Quality of Service capabilities, the two-wire exchange system 10 may alter the availability of services based upon bandwidth and minimize delay, jitter (i.e., variation in delay from different sources), and loss characteristics. For example, a particular bandwidth may be dedicated to particular data (e.g., game meter data). In another example, data may be checked for errors before it is sent to a gaming machine 40.

According in this embodiment, the messages from the hosts to the two wire exchange system may be transmitted via speeds up to or exceeding 100 Mbps (megabytes per second) whereas messages from the gaming machine to the two wire exchange may be transmitted at lower speeds (e.g., 19 Kbps). Accordingly, the two wire exchange system is able to reconcile these different data transmission speeds by time-regulating the response. According to one embodiment, the two wire exchange system includes a large data buffer along with "stop" or "hold" commands. The data buffer allows the two wire exchange system to receive data at high speed and transmit at a low speed. The "stop" and "hold" commands may be issued to the data being received at high speed so that the low speed equivalent data may be transmitted out to a peripheral device.

Generally, the two-wire exchange system 10 includes a plurality of Quality of Service levels. According to one embodiment, the system 10 includes a best-effort service, differentiated service, and guaranteed service. The best-effort service is a baseline service that does have any preference for any data. The differentiated service classifies data so that some data may receive preferential treatment (e.g., faster handling, more bandwidth, and lower loss). The guaranteed service provides system services that are dedicated to a particular type of data. As those skilled in the art will appreciate, the system 10 may include any number or combination of service levels.

In order to provide different service levels, data needs to be identified and, optionally, marked. In one embodiment, data packets are classified according to access control lists. In another embodiment, extended access control lists are used to classify data packets. These access control lists establish rules that adjust data priority based upon network protocol (e.g., TC/IP, IPX, Novell, or AppleTalk), packet size, the source address, destination address, or any combination thereof. For example, data from a casino management system or casino accounting system (e.g., a slot data system (SDS)) will be given a higher priority than data from a player tracking system. Accordingly, the two-wire exchange system 10 will transmit the data from the casino management system to the gaming machine 40 before transmitting the data from the player tracking system to the gaming machine.

Alternatively, IP precedence bits, which are the first 3 bits of the type of service field in an IP header, may be used to set data priority. The IP precedence is a numerical value (typically, between 0-7) that identifies the importance of the data packet. For example, these values may correspond to precedence values such as normal, priority, immediate, critical, and the like. Optionally, the next four bits after the IP precedence bits may be used to identify the type of service (e.g., maximum reliability, maximum throughput, minimum delay, minimum monetary cost, and normal).

Once the data is classified, the two-wire exchange system 10 may be configured to control the flow of data. According to one method of providing quality of service, the system 10 may use queue management techniques to control data flow. As those skilled in the art will appreciate, queues are the locations in which data packets are held and different queuing methods address how a particular data packet is treated. Queues have a finite size and data packets may be lost when the queue becomes full. In order to prevent the queue from becoming full and to prevent the loss of data packets, queue management methods such as, but not limited to, random early detection (RED) or weighted random early detection (WRED) may be used by the two-wire exchange system 10. RED and WRED are methods in which queue congestion is avoided by monitoring network traffic loads at particular points in the network and randomly dropping packets in order to alleviate queue congestion. The source of the dropped data packet detects that the data packet has been dropped and then slows any further data transmissions. As those skilled in the art will appreciate RED is designed to work with TCP in IP internet environments. In contrast to RED, WRED allows for selective dropping of data packets in order to alleviate queue congestion. For example, data packets may be preferentially treated based upon the quality service level set forth in the IP precedence bit. In one embodiment, WRED may be configured such that high priority data packets are not dropped. However, as those skilled in the art will appreciate, packet loss is not preferred and the queue management methods may be customized or altered to prevent data packet loss.

According to another method of providing quality of service, the system 10 may be use congestion management techniques to prioritize data flow. These congestion management techniques address the situation where the data traffic exceeds the speed of a link. In the event that data traffic exceeds link speed, the data packets may be buffered in a single queue and released according to a FIFO (first in first out). Alternatively, the data packets may be placed in one or more queues and different queues. The methods in which the plurality of queues are serviced may be based upon queuing methods such as priority queuing, custom queuing, and fair weighted queuing. With priority queuing, data is prioritized based upon some data characteristic including by way of example, and not of limitation, network protocol, data source, packet size, destination address, or the like. Based upon the data characteristic, the data packet is placed into a particular queue (e.g., high, medium, normal, and low priority queues). Accordingly, the data packets in the high priority queue are given preferential treatment as compared to lower priority queues. As those skilled in the art will appreciate fewer or more queues having different priority levels may be used in this system.

With respect to custom queuing, two or more queues are established according to the classification of the data packets. According to one embodiment, the classification criteria for the data are similar to the classification system for priority queuing. The queues are then serviced in a round-robin manner. With respect to fair weighted queuing, the queues are serviced according to byte count. That is, the fair weighted queuing algorithm may take, for example, 100 bytes of data from each queue. According to the previous example, two 50-byte packets will be taken from a queue and four 25-byte packets will be taken from another queue. Fair weighted queuing is efficient use of bandwidth because more lower priority packets may be sent if there is no high priority traffic is present. As those skilled in the art will appreciate, the various methods of managing data flow are used when the data flow is congested. Otherwise, the system 10 delivers the data packets directly to the gaming machines 40.

According to yet another method of providing quality of service capabilities, the system 10 may use link efficiency techniques such as, but not limited to, fragmentation and interleaving to maintain data flow. For example, a large packet (e.g., video packet) may be fragmented into a plurality of smaller packets. Additionally, a subsequent data packet (e.g., audio packet) may be interleaved with these smaller video packets. Accordingly, the delay in delivering the audio packet is minimized as compared to having the audio packet follow the video packet during transmission.

In one method of providing quality of service capabilities, the system 10 also may be configured to shape traffic flow so that less than the full bandwidth is utilized thereby minimizing the possibility of data overflow and loss due to overutilization of bandwidth. When the system bandwidth is exceeded, the overflow data is buffered for later transmission. Alternatively, the overflow data may be discarded when system bandwidth is exceeded. However, the system originating the discarded data is notified that the data has not been successfully transmitted. Accordingly, the discarded data may be retransmitted at a later time.

In yet another method of managing data flow in a gaming machine in communication with one or more system hosts, one or more data packets are transmitted from one or more system hosts to the two-wire exchange system 10. The two-wire exchange system 10 receives the data packets and prioritizes the data packets based upon access control lists, expanded access control lists, or IP precedence bits. According to one embodiment, the type of data in the data packet determines priority. Based upon the type of data packet, the priority of the data packet may be raised or lowered. For example, a low priority message may be placed in a queue to be sent at a later time or at a later scheduled time. In contrast, a high priority message may be immediately sent to the gaming machine 40. Furthermore, higher priority data packets may be provided with additional bandwidth or dedicated bandwidth for message transmission. Furthermore, higher priority data packets may be sent with minimal delay or jitter, which is important for time-sensitive data such as real-time voice or video data.

Accordingly, based upon the priority criteria, the two-wire exchange system 10 may vary the rate and, optionally, the loss characteristics of the received data packets. Alternatively, other identifying information regarding the data packet may be used to determine the priority of the message (e.g., network protocol, packet size, host source address, or destination address).

In other preferred embodiments of the invention, the two-wire exchange system 10 uses asynchronous transfer mode (ATM) for allowing multiple messages or signals to share a communication transmission channel. In ATM, messages are conveyed in small, fixed-size time slots, but unlike TDM, these time slots (cells) are available on demand and not assigned to a particular communication transmission channel. The fixed-size cells are generally 53 bytes in size with a 5-byte header. The header contains information regarding the source of the transmission and the remaining 48 bytes contain the data.

In one embodiment of a two-wire exchange system having ATM transmission capabilities, a particular message can use all of the time slots (or utilize unused time slots) within a communication channel. Alternatively, the availability of communication transmission channel resources may be apportioned by other criteria. For example, the time criticality of the message determines how messages are transmitted. In one embodiment, the time criticality of the message is contained within the message header. In alternate embodiments, existing information in the cell header may be used to classify the priority of the message. For example, the type of payload data, the source address, or destination address of the data may be used to identify data having transmission priority. Accordingly, the two-wire exchange system 10 arbitrates between time critical and non-critical messages and gives priority to time-critical messages.

In one embodiment, the two-wire exchange system 10 implements a deterministic response to time critical data. That is, a predictable response to handle time critical data will be carried out by the system 10. For example, in one embodiment, a deterministic response will result in the time critical data immediately being sent to the gaming machine 40. In another embodiment, the time critical data may be checked for loss (i.e., fidelity of the data), after which the data is immediately sent to the gaming machine 40.

Alternatively, one of ordinary skill in the art will appreciate that the two-wire exchange system 10 may also implement a probabilistic response to non-time critical data. That is, the response (i.e., handling) of non-time critical data is not predictable. Accordingly, non-time critical data may be sent when there is available bandwidth, only after all high priority data has been sent, or at some other undefined time.

In one embodiment, an ATM network (not shown) comprises one or more system hosts such as, but not limited to, a player tracking system, a slot management system, a game monitoring unit, a voucher system, a casino management system, a cashless wagering system, or the like. Additionally, the ATM network includes one or more ATM switches. The ATM switches are responsible for transmitting cells (i.e., time slots) through the network. In one embodiment, when the ATM switch receives a cell, the ATM switch reads and updates the cell header, and the cell is then transmitted to the next ATM switch or to an ATM endpoint. The ATM endpoint may be a system host, gaming machine 40, workstation, LAN switch, or any other destinations within a network. Preferably, the ATM network includes two types of interfaces, User to Network Interface (UNI) and Network-to-Network Interface (NNI) that interconnect the various components in the network. A NNI interface is used to link ATM switches together, and a UNI interface connects an ATM switch to an ATM endpoint.

In another embodiment, the two wire exchange system is a central distribution point within the gaming machine. Accordingly, the two wire exchange system receives messages from multiple hosts that may be then distributed to one or more peripheral devices within the gaming machine. In one preferred embodiment, the two wire exchange is a TCP/IP-enabled device that acts as a message router between multiple hosts and multiple peripheral devices within the gaming machine. In one embodiment, each peripheral device located within the gaming machine is assigned a unique internet protocol (IP) address. One or more system hosts may send a TCP/IP protocol message to a particular component within the gaming machine. The two wire exchange system receives the message through a single Ethernet port and routes the message to the component identified by an IP address, Uniform Resource Locator (URL), Media Access Control (MAC) address, or other unique identifier.

According to one embodiment, the various peripheral components within the gaming machine communicate with the two wire exchange system via a single communication port (e.g., Ethernet port). Alternatively, the two wire exchange system may have a plurality of Ethernet ports that are connected to particular component within the gaming machine such as, but not limited to, a game monitoring unit (GMU), slot machine interface board (SMIB), bill acceptor, printer, card reader, or card reader display. In either of these embodiments, the two wire exchange system receives Ethernet protocol messages and routes them to the proper peripheral component. Alternatively, the two wire exchange system receives XML messages and converts these messages into the appropriate protocol messages for the intended peripheral device. For example, the two wire exchange system may convert the XML messages into USB, $I^2C$, or RS232 protocol messages that are sent to one or more peripherals within the gaming machine.

Additionally, the two wire exchange system 10 is able to break a single host message into one or more messages. According to one embodiment, the single host message is divided into those messages that are time-critical and non-time critical. Time-critical messages requests are sent to the gaming machine, and the two wire exchange system waits for the response from the gaming machine. Once the two wire exchange system receives the response from the gaming machine, the two wire exchange sends the response to the host. Once the time-critical responses are completed, the two wire exchange system 10 sends non-time critical messages to the gaming machine, waits for a response from the gaming machine, and sends the response(s) from the gaming machine to the host. As those skilled in the art will appreciate, the two wire exchange system may divide the messages received from multiple hosts according to various criteria.

In other embodiments, the two wire exchange system 10 prioritizes messages according to content, header identifier, an identifier associated with the message, or a combination thereof. The two wire exchange system has an algorithm or software that allows the system to prioritize incoming and outgoing messages. As those skilled in the art will appreciate, a hierarchy of messages may be developed and implemented by the two wire exchange system in order to prioritize messages. For example, financial data or revenue-affecting messages (e.g., Electronic funds transfers) are given priority over data collection or monitoring messages (e.g., daily game accounting).

In another embodiment, the header identifier or other identifiers may allow the two wire exchange system to route the message to the appropriate peripheral device or system host. For example, a message sent to or from a voucher printer may have higher priority as compared to other messages. Alternatively, messages may be prioritized based upon the type of poll. For example, IGT SAS system includes a general poll versus a long poll scheme for obtaining event information versus machine data, respectively. Accordingly, in one embodiment, the two wire exchange system is configured to favor long polls over general polls. Alternatively, the two wire exchange system may be configured to favor general polls over long polls. In another embodiment, the two wire exchange system is configured to alter the priority of a long poll versus a general poll based upon user-selected criteria such as, but not limited to, the time of day, month, or year.

In yet another embodiment, the IP address, MAC address, or other unique identifier associated with the system host or the peripheral device determines the priority of the message. For example, a message sent to a an IP address for a voucher printer or an electronic fund transfer device is given priority to a message having a destination IP address for a player tracking device (i.e., a data collecting device).

In another preferred embodiment, the two wire exchange system is a combination of hardware and software. In yet another preferred embodiment, the two wire exchange system is a software routine running inside the gaming machine or a component of the gaming machine. For example, a GMU or a SMIB may run a program that allows the GMU or the SMIB to function as an intelligent multiplexer. In these embodiments, messages from multiple hosts are sent through a single port on the gaming machine, and the processing unit of the gaming machine is able to arbitrate the various messages received from the hosts.

Although the invention has been described in language specific to computer structural features, methodological acts, and by computer readable media, it is to be understood that the invention defined in the appended claims is not necessarily limited to the specific structures, acts, or media described. Therefore, the specific structural features, acts and mediums are disclosed as exemplary embodiments implementing the claimed invention.

Furthermore, the various embodiments described above are provided by way of illustration only and should not be construed to limit the invention. Those skilled in the art will readily recognize various modifications and changes that may be made to the invention without following the example embodiments and applications illustrated and described herein, and without departing from the true spirit and scope of the present invention, which is set forth in the following claims.

What is claimed:

1. A gaming system, comprising:

a gaming device only having a single Ethernet communication port;

a plurality of peripheral devices located within the gaming device, wherein the plurality of peripheral devices use the single Ethernet communication port to communicate with a plurality of system hosts; and an intelligent multiplexer in simultaneous communication with the plurality of system hosts, wherein the intelligent multiplexer communicates with the gaming device only through the single Ethernet communication port and enables the single Ethernet communication port to function as if the single Ethernet communication port is a plurality of ports, and wherein the intelligent multiplexer arbitrates communication between the peripheral devices and the system hosts by controlling the timing of when each of the system hosts communicates with the gaming machine using fixed time response windows, wherein the intelligent multiplexer enables the system hosts to communicate with the gaming machine using requests that are made in accordance with the fixed time response windows, wherein a fetching period is the time required for the gaming machine to respond to a request, and wherein the multiplexer is capable of arbitrating the requests even when the fixed time response windows are shorter than the fetching period.

2. The gaming system of claim 1, wherein the intelligent multiplexer includes a protocol converter.

3. The gaming system of claim 1, wherein an internet protocol address is assigned to each peripheral device.

4. The gaming system of claim 1, wherein the peripheral devices are internal components of the gaming device.

5. The gaming system of claim 4, wherein the peripheral device is a game monitoring unit, slot machine interface board, bill acceptor, ticket printer, card reader, card reader display, or a combination thereof.

6. The gaming system of claim 1, wherein the intelligent multiplexer includes a game monitoring unit that monitors a game and accounting-related data.

7. A gaming system, comprising:

a gaming device only having a single Ethernet communication port;

a plurality of peripheral devices located within the gaming device, wherein the plurality of peripheral devices use the single Ethernet communication port to communicate with a plurality of system hosts; and an enhanced multiplexer in simultaneous communication with a plurality of system hosts, wherein the intelligent multiplexer communicates with the gaming device only through the single Ethernet communication port and enables the single Ethernet communication port to function as if the single Ethernet communication port is a plurality of ports, and wherein the enhanced multiplexer includes a game monitoring unit to monitor one or more games on the gaming device and game accounting-related data; and wherein the intelligent multiplexer enables the system hosts to communicate with the gaming machine using requests that are made in accordance with fixed time response windows, wherein a fetching period is the time required for the gaming machine to respond to a request, and wherein the intelligent multiplexer is capable of arbitrating the requests even when the fixed time response windows are shorter than the fetching period.

8. The gaming system of claim 7, wherein the enhanced multiplexer includes a protocol converter.

9. A method of remotely controlling a peripheral device in a gaming machine, the method comprising:

providing a gaming machine only having a single communication port coupled to an intelligent multiplexer, wherein the intelligent multiplexer is in simultaneous communication with a plurality of system hosts, and wherein the intelligent multiplexer communicates with a plurality of peripheral devices located within the gaming machine only through the single Ethernet communication port;

receiving multiple system messages sent from multiple system hosts that are intended for one or more peripheral devices;

arbitrating the system messages between the peripheral devices and the system hosts by controlling the timing of when each of the system hosts communicates with the gaming machine using fixed time response windows, wherein the intelligent multiplexer enables the system hosts to communicate with the gaming machine using requests that are made in accordance with the fixed time response windows, wherein a fetching period is the time required for the gaming machine to respond to a request, and wherein the multiplexer is capable of arbitrating the requests even when the fixed time response windows are shorter than the fetching period; and sending each system message to an intended peripheral device.

10. The method of claim 9, further comprising:

receiving one or more messages sent from the peripheral devices of the gaming machine;

arbitrating the received messages by the intelligent multiplexer; and transmitting the received messages to one or more system hosts.

11. The method of claim 9, wherein arbitrating the system messages further comprises prioritizing data flow from the plurality of system hosts.

12. The method of claim 9, wherein data flow is prioritized by one or more quality of service parameters.

13. The method of claim 9, wherein data flow is prioritized by time criticality of the messages.

14. The method of claim 9, further comprising fragmenting data packets to control data flow.

15. The method of claim 9, further comprising splitting data messages to control data flow.

* * * * *

UNITED STATES PATENT AND TRADEMARK OFFICE

CERTIFICATE OF CORRECTION

PATENT NO. : 8,500,556 B2
APPLICATION NO. : 11/735333
DATED : August 6, 2013
INVENTOR(S) : James W. Morrow et al.

It is certified that error appears in the above-identified patent and that said Letters Patent is hereby corrected as shown below:

In the Specification

Column 2, In line 45, replace “as” with --a--

Column 7, In line 27, insert --)-- after “SAS”

Column 9, In line 55, remove “s” from “embodiments”

Column 10, In line 2, remove “s” from “needs”

Column 10, In line 43, insert --system-- after “exchange”

Column 10, In line 59, insert --not-- after “does”

Column 14, In line 6, insert --system-- after “exchange”

Column 14, In line 40, remove “s” from “messages”

Column 14, In line 44, insert --system-- after “exchange”

Signed and Sealed this
Twenty-second Day of October, 2013

Teresa Stanek Rea
*Deputy Director of the United States Patent and Trademark Office*